US009133770B2

(12) United States Patent
Henkle et al.

(10) Patent No.: US 9,133,770 B2
(45) Date of Patent: Sep. 15, 2015

(54) FUEL NOZZLE ENCLOSURE

(75) Inventors: Jeffrey P. Henkle, Indianapolis, IN (US); Thomas R. Bowman, Greenfield, IN (US); Ronald P. Porter, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 2252 days.

(21) Appl. No.: 12/014,304

(22) Filed: Jan. 15, 2008

(65) Prior Publication Data
US 2009/0178411 A1 Jul. 16, 2009

(51) Int. Cl.
*F23R 3/60* (2006.01)
*F02C 7/22* (2006.01)
*F23R 3/28* (2006.01)

(52) U.S. Cl.
CPC . *F02C 7/22* (2013.01); *F23R 3/283* (2013.01); *F05D 2240/14* (2013.01); *Y10T 137/5762* (2015.04); *Y10T 137/7043* (2015.04)

(58) Field of Classification Search
USPC ........ 60/739, 39.37, 734, 39.094, 39.01, 740, 60/39.091, 742, 746, 747; 137/377; 239/533.2
See application file for complete search history.

(56) References Cited

U.S. PATENT DOCUMENTS

| 4,708,371 | A  |   | 11/1987 | Elsworth et al. |
|-----------|----|---|---------|-----------------|
| 5,170,659 | A  | * | 12/1992 | Kemp ............................ 73/46 |
| 5,259,185 | A  | * | 11/1993 | Peterson .................... 60/39.094 |
| 5,263,314 | A  |   | 11/1993 | Anderson |
| 5,348,044 | A  | * | 9/1994  | Eugene et al. ................ 137/312 |
| 5,610,324 | A  | * | 3/1997  | Lawson ............................ 73/46 |
| 6,918,255 | B2 | * | 7/2005  | Kaplan et al. .................. 60/734 |

* cited by examiner

Primary Examiner — Phutthiwat Wongwian
Assistant Examiner — Steven Sutherland
(74) Attorney, Agent, or Firm — Krieg DeVault LLP

(57) ABSTRACT

An enclosure assembly for enclosing a portion of a fuel delivery system of an engine, such as a portion of a fuel nozzle body that extends away from the engine, is disclosed herein. The enclosure assembly includes a nozzle body cover portion operable to enclose a fuel nozzle body. The enclosure assembly also includes a fuel line cover portion unitary with the nozzle body cover portion and operable to enclose a portion of a fuel supply line connected to the fuel nozzle body. Both the nozzle body cover portion and the fuel line cover portion are defined by a first and second half-shells operable to cooperate together in a clam shell arrangement.

20 Claims, 6 Drawing Sheets

FUEL NOZZLE ENCLOSURE

BACKGROUND OF THE INVENTION

1. Field of the Invention

The subject invention relates generally to a fuel delivery system of an engine and more specifically to an enclosure for a portion of a fuel nozzle of an engine.

2. Description of the Prior Art

Engines, such as gas turbine engines or other kinds of engines, may include fuel delivery systems that include fuel injection nozzles that partially extend away from the engine. In some applications, these fuel nozzles are an assembly of several parts and the joints between those parts can define potential leak paths for fuel. It can be necessary or at least desirable to enclose such fuel nozzles to capture any fuel that leaks past a primary seal of the fuel nozzle.

The Federal Aviation Authority (FAA) requires that the design and construction of the engine and the materials used must minimize the probability of the occurrence and spread of fire. The FAA also requires that each external line, fitting, and other component, which contains or conveys flammable fluid must be fire resistant and components must be shielded or located to safeguard against the ignition of leaking flammable fluid. These requirements can be found at Title 14 of the Code of Federal Regulations, Section 33.17.

SUMMARY OF THE INVENTION

In summary, the invention is an enclosure assembly for enclosing a portion of a fuel system of an engine, such as a portion of a fuel nozzle body that extends away from the engine. The enclosure assembly includes a nozzle body cover portion operable to enclose a fuel nozzle body. The enclosure assembly also includes a fuel line cover portion unitary with the nozzle body cover portion and operable to enclose a portion of a fuel supply line connected to the fuel nozzle body. Both of the nozzle body cover portion and the fuel line cover portion are defined by a first and second half-shells operable to cooperate together in a clam shell arrangement.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION OF THE INVENTION

Figure 1:
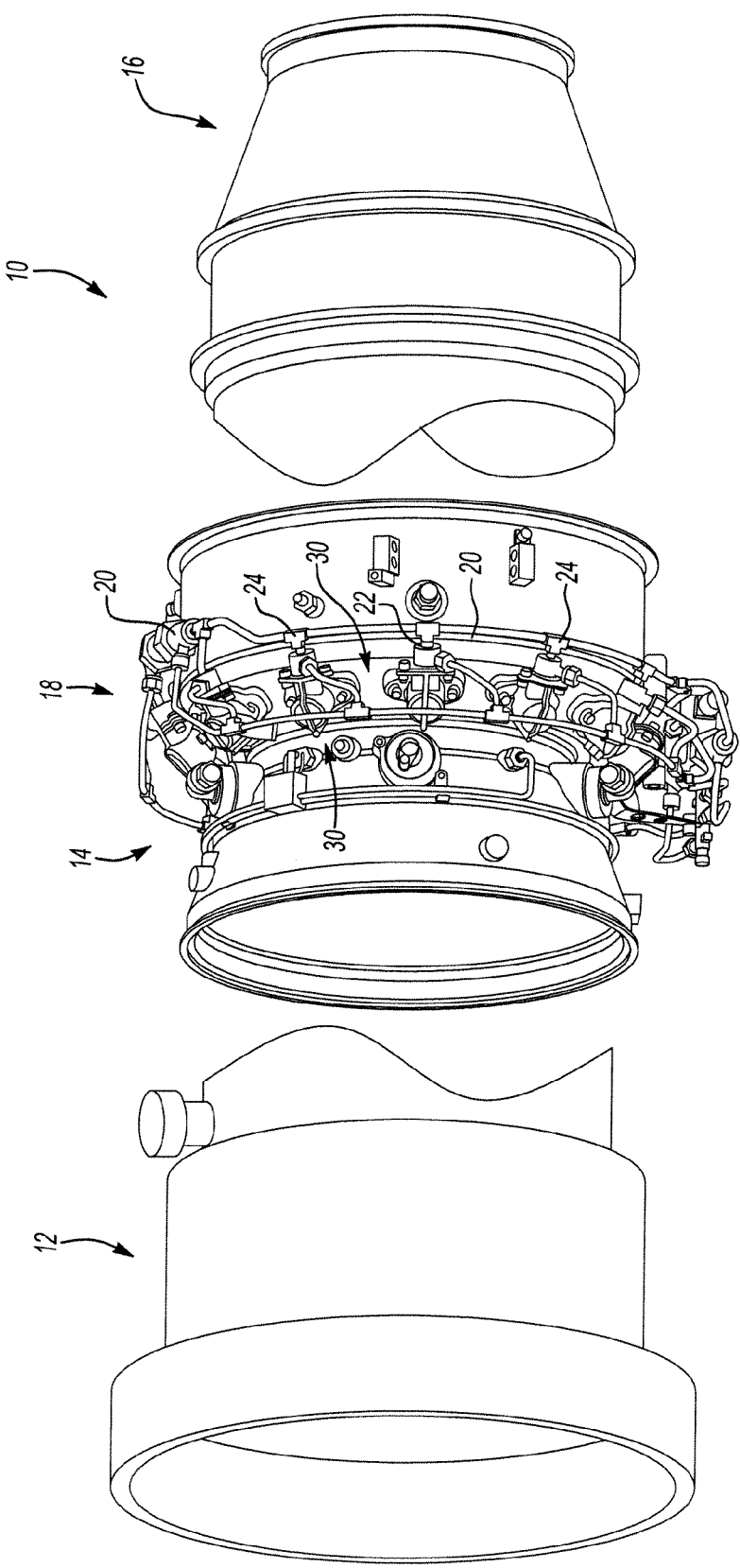
FIG. 1 is a partially schematic view of a gas turbine engine with a combustor section shown in detailed perspective.

A plurality of different embodiments of the invention are shown in the figures of the application. Similar features are shown in the various embodiments of the invention. Similar features have been numbered with a common reference numeral and have been differentiated by an alphabetic suffix. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

In some engines, fuel nozzles inject fuel into combustion zones such as the interior of a cylinder in a reciprocating engine or the interior volume of a combustor section in a gas turbine engine. Fuel nozzles can include a body portion that extends outward, away from the engine. This outer portion of the fuel nozzle may include a plurality of individual components that are connected together. Each connection between two or more components defines a path for potential fuel leakage. It can therefore be desirable to enclose the fuel nozzle to enclose all of the paths of potential fuel leakage. In addition, it can be desirable to form an enclosure for a fuel nozzle such that the enclosure can be removed and re-installed.

Referring to FIG. 1, a portion of a gas turbine engine is generally shown at 10. The engine 10 includes a compressor section 12 (shown schematically) for compressing air, a combustor section 14 in communication with the compressor section 12, and a turbine section 16 (also shown schematically) in communication with the combustor section 14. A fuel delivery system is generally indicated at 18 and distributes a supply of fuel to the combustor section 14 to mix with the compressed air received from the compressor section 12. The fuel delivery system 18 includes a fuel manifold 20 and a plurality of fuel supply lines 22 in communication with the fuel manifold 20. The fuel supply lines 22 are coupled to the fuel manifold 20 by a plurality of fluid fittings 24.

Figure 2:
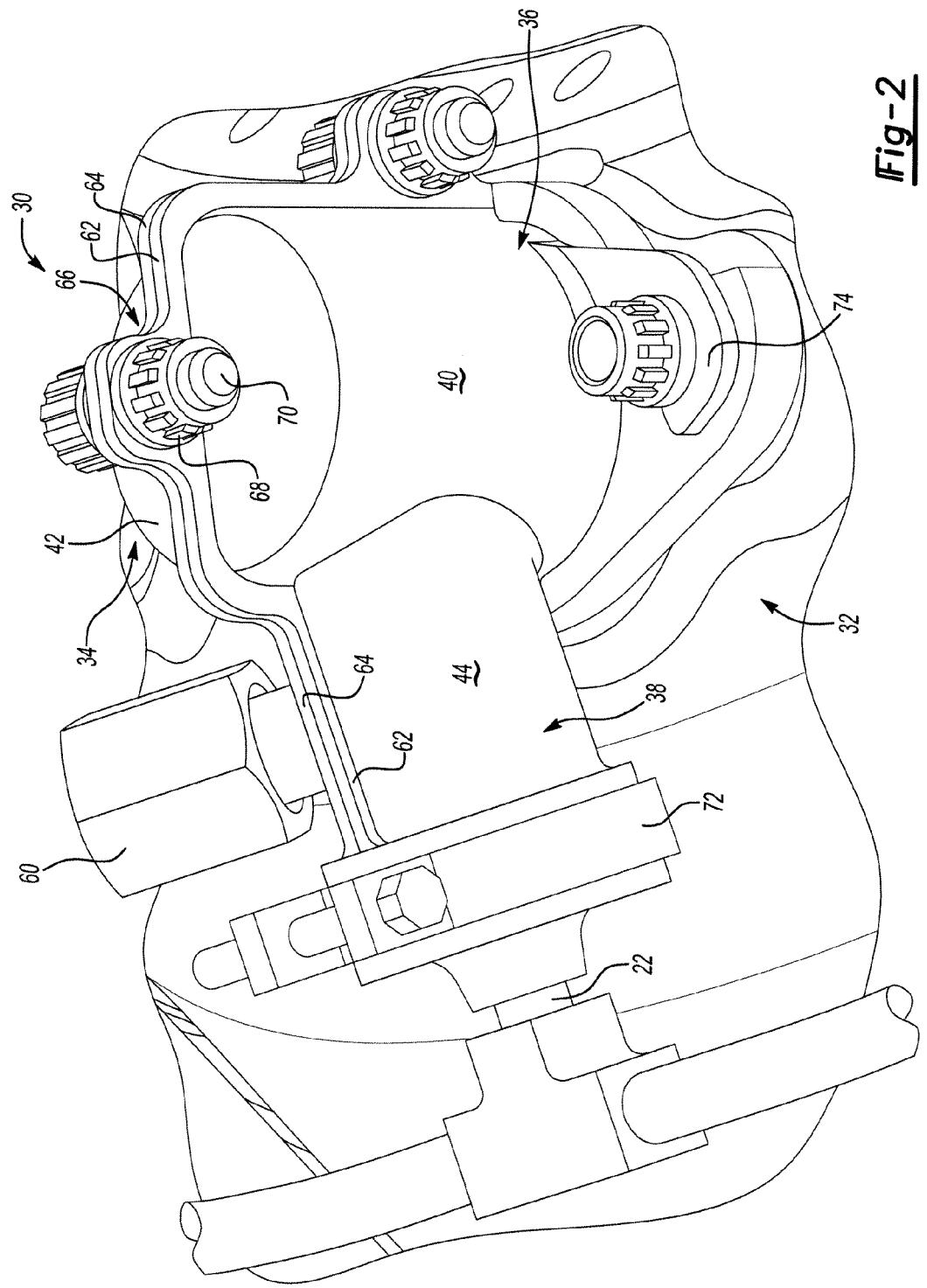
FIG. 2 is a first perspective view of an enclosure assembly according to a first exemplary embodiment of the invention.
Figure 3:
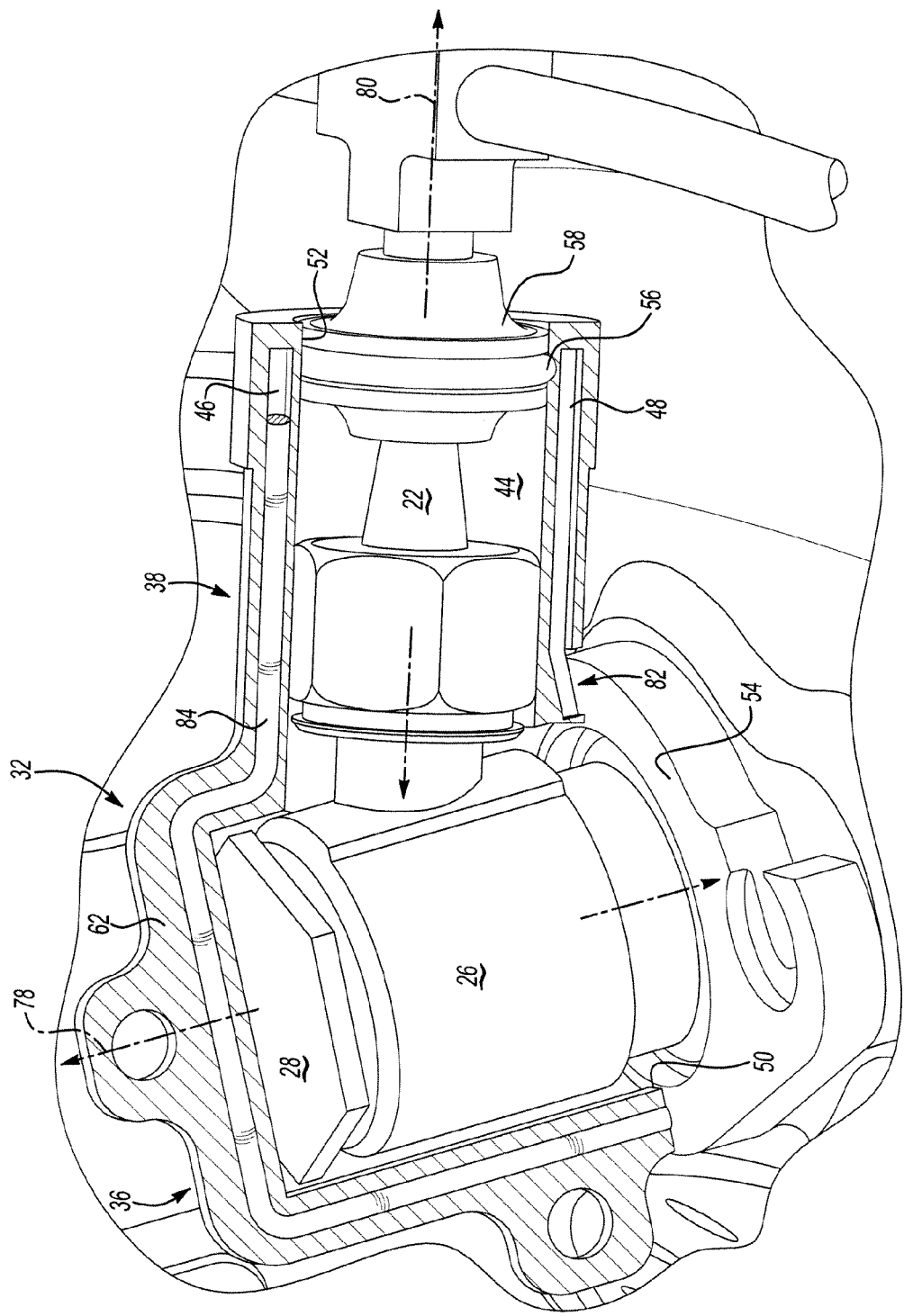
FIG. 3 is a second perspective view of the first exemplary enclosure assembly, partially disassembled to show the interior of the enclosure assembly.

Referring now to FIGS. 1-3, the fuel supply lines 22 individually communicate fuel to one of a plurality of fuel nozzle bodies 26. The fuel nozzle bodies 26 are spaced circumferentially about the combustor section 14 shown in FIG. 1. The fuel nozzle bodies 26 each have a fuel nozzle cap 28 disposed at an upper end. The fuel nozzle cap 28 includes threads for threading engagement with the fuel nozzle body 26. The cap 28 can be a desirable feature of the fuel nozzle for servicing and replacing internal components of the fuel nozzle; however, the threaded connection between the cap 28 and the body 26 defines a leak path.

A plurality of enclosure assemblies 30 are individually positioned about the combustor section 14 to enclose one of the fuel nozzle bodies 26, the associated cap 28, and a portion of the associated fuel supply line 22. As used herein, the fuel supply line 22 includes a pipe or tube portion and/or any fitting or hardware disposed to connect the pipe or tube portion to the nozzle body 26.

Each enclosure assembly 30 includes first and second half-shells 32 and 34 that cooperate with one another in a clam shell arrangement to enclose the nozzle body 26 and at least a portion of the fuel line 22. The nozzle body 26 is enclosed by a nozzle body cover portion 36 of the enclosure assembly 30. The fuel line 22 is enclosed by a fuel line cover portion 38 of the enclosure assembly 30. The nozzle body cover portion 36 and the fuel line cover portion 38 are unitary, as shown best by FIG. 2.

Referring now to FIG. 2 in particular, the first half-shell 32 includes a half-cup portion 40 shaped to correspond to the shape of the nozzle body 26. Likewise, the second half-shell 34 includes a half-cup portion 42 shaped to correspond to the shape of the nozzle body 26. The half-cup portions 40, 42 are substantially mirror images of one another in the first exemplary embodiment of the invention, but could be shaped differently from one another in alternative embodiments of the invention. The half-cup portions 40, 42 cooperate to define the nozzle body cover portion 36.

The first half-shell 32 also includes a half-sleeve portion 44 shaped to correspond to the shape of the fuel line 22. Likewise, the second half-shell 34 includes a half-sleeve portion (not visible) shaped to correspond to the shape of the fuel line 22. The half-sleeve portions, including the visible half-sleeve portion 44 and the non-visible half-sleeve portion, are substantially mirror images of one another in the first exemplary embodiment of the invention, but could be shaped differently from one another in alternative embodiments of the invention. The half-sleeve portions, including the visible half-sleeve portion 44 and the non-visible half-sleeve portion, cooperate to define the fuel line cover portion 38. For each half-shell 32, 34, the half-cup portion 40 and said half-sleeve portion 44 are further defined as individually centered on axes 78, 80 that are transverse to one another as shown in FIG. 3.

The half-cup and half-sleeve portions 40 and 44 of the first half-shell 32 are integrally-formed and unitary in the first exemplary embodiment of the invention. Similarly, the half-cup portion 42 and non-visible half-sleeve portion of the second half-shell 34 are integrally-formed and unitary in the first exemplary embodiment of the invention. Thus, the first and second half-shells 32, 34 of the enclosure assembly 30 do not individually define any leak paths.

A gasket, o-ring, or some other sealing structure can be positioned between the first and second half-shells 32, 34 to eliminate leak paths. For example, FIG. 3 shows the half-shell 32 having tracks 46, 48 for receiving gaskets to eliminate potential leak paths. A portion of an exemplary seal 84 is shown in the track 46, with a portion not shown so that the track 46 may be more clearly shown. The seal 84 extends along a portion of a periphery of the enclosure assembly 30 that is defined by both first and second half-shells 32, 34. In other words, the seal 84 eliminates a leak path between the first and second half-shells 32, 34. A similarly-functioning seal can be positioned in the track 48.

When the first and second half-shells 32, 34 are connected, the first exemplary enclosure assembly 30 defines a first opening 50 encircling the nozzle body 26 and a second opening 52 encircling the fuel line 22. As shown in the Figures, the openings 50, 52 are defined in different planes. The track 48 extends along a portion of a periphery of the enclosure assembly 30 that is partially defined by both of the first and second half-shells 32, 34. This portion of the periphery is extends between the opening 52 and an end 82 of the track 48. This portion of the periphery can be considered the underside of the fuel line cover portion 38 of the enclosure assembly 30.

The exemplary track 48 also extends along a portion of the periphery defined by only the first half-shell 32. Specifically, the track 48 can extend semi-annularly from the end 82 around one-half of the opening 50. The track 48 can receive a seal that is operable to seal the first half-shell 32 against a surface 54 of another structure, such as the combustor section 14, to seal the first opening 50. Thus, a seal positioned in the track 48 would eliminate a leak path extending between the first and second half-shells 32, 34 and would also eliminate a leak path defined across only the first half-shell 32.

In the first exemplary embodiment of the invention, the second opening 52 is sealed by an o-ring 56 mounted in an annular ferrule 58. The annular ferrule 58 encircles and seals against the fuel line 22. Thus, the enclosure assembly 30 can cooperate with appropriate gaskets, o-rings, and other structures to define a sealed cavity in which the nozzle body 32 and at least a portion of the fuel line 22 are positioned. A drain 60 shown in FIG. 2 can communicate with the interior of enclosure assembly 30 to drain any leaked fuel contained in the cavity. The drain 60 communicates with an inner volume of the enclosure assembly 30.

The first and second half-shells 32, 34 can include flanges and extensions as desired for attaching the first and second half-shells 32, 34 together. These structures can also be operable to attach the first and second half-shells 32, 34 to the combustor section 14 or any other intermediary structure that connects the nozzle body 26 to the combustor section 14. In the first exemplary embodiment of the invention, flanges 62, 64 project from the first and second half-respectively shells 32, 34, respectively and extend around a substantial portion of the periphery of the enclosure assembly 30. The portion of the periphery can be considered an outwardly-facing or top portion. The flanges 62, 64 can define one or more aligned apertures for receiving fasteners, such as fasteners 66 each comprising a nut 68 and a bolt 70. The first and second half-shells 32, 34 can also be connected together with other types of structures, such as a clamp 72.

An extension 74 projects from the first half-shell 32 and is hook-like. A fastened can be received in the hook and press the extension 74 against the combustor section 14 or any other structure that connects the nozzle body 26 to the combustor section 14 to prevent the enclosure 30 from moving relative to the combustor section 14. The hook shape also allows the enclosure assembly 30 to be at least partially adjustable with respect to its position. However, any structure can be employed to connect the enclosure assembly 30 to a support structure.

Figure 4:
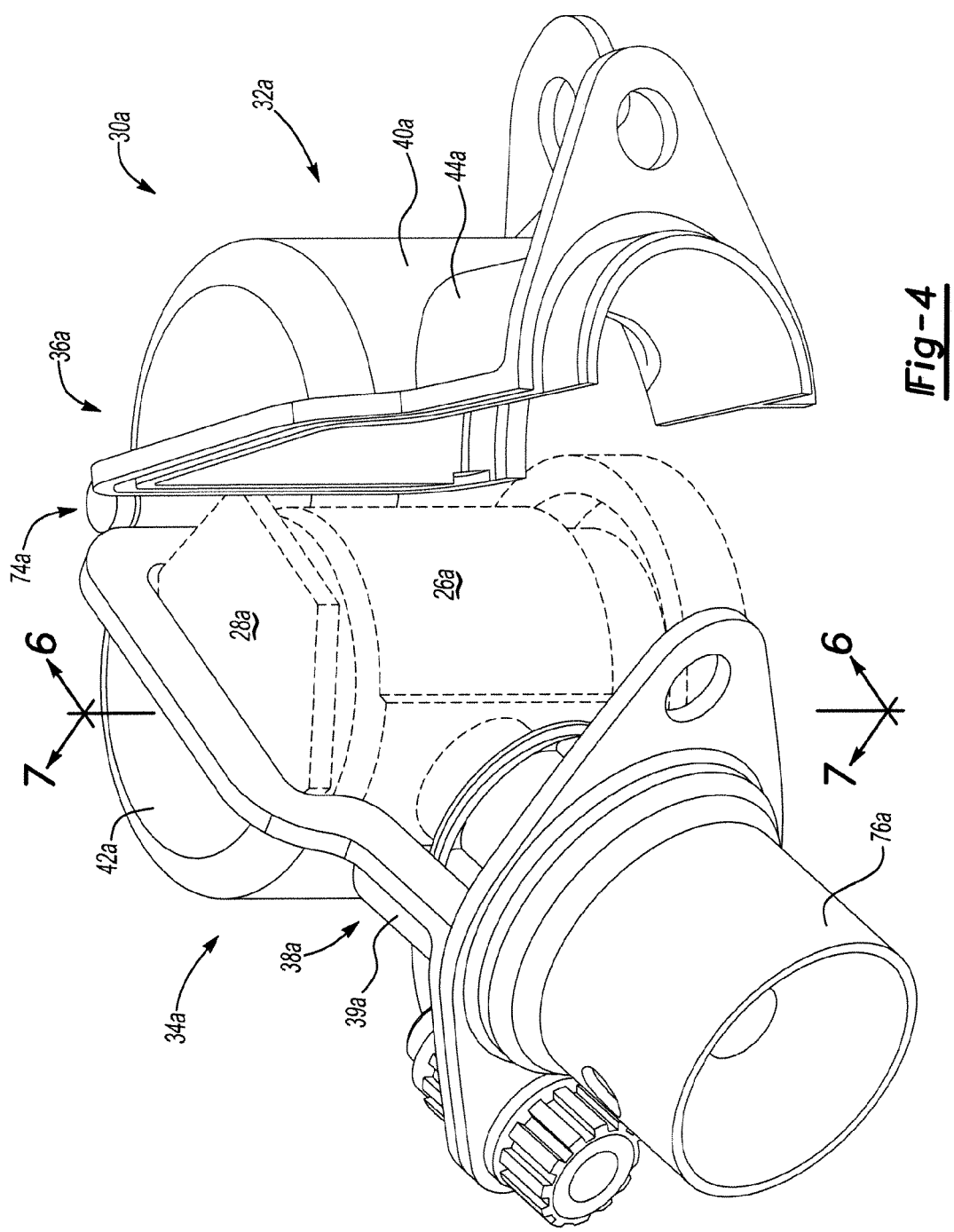
FIG. 4 is a perspective view of an enclosure assembly according to a second exemplary embodiment of the invention.
Figure 5:
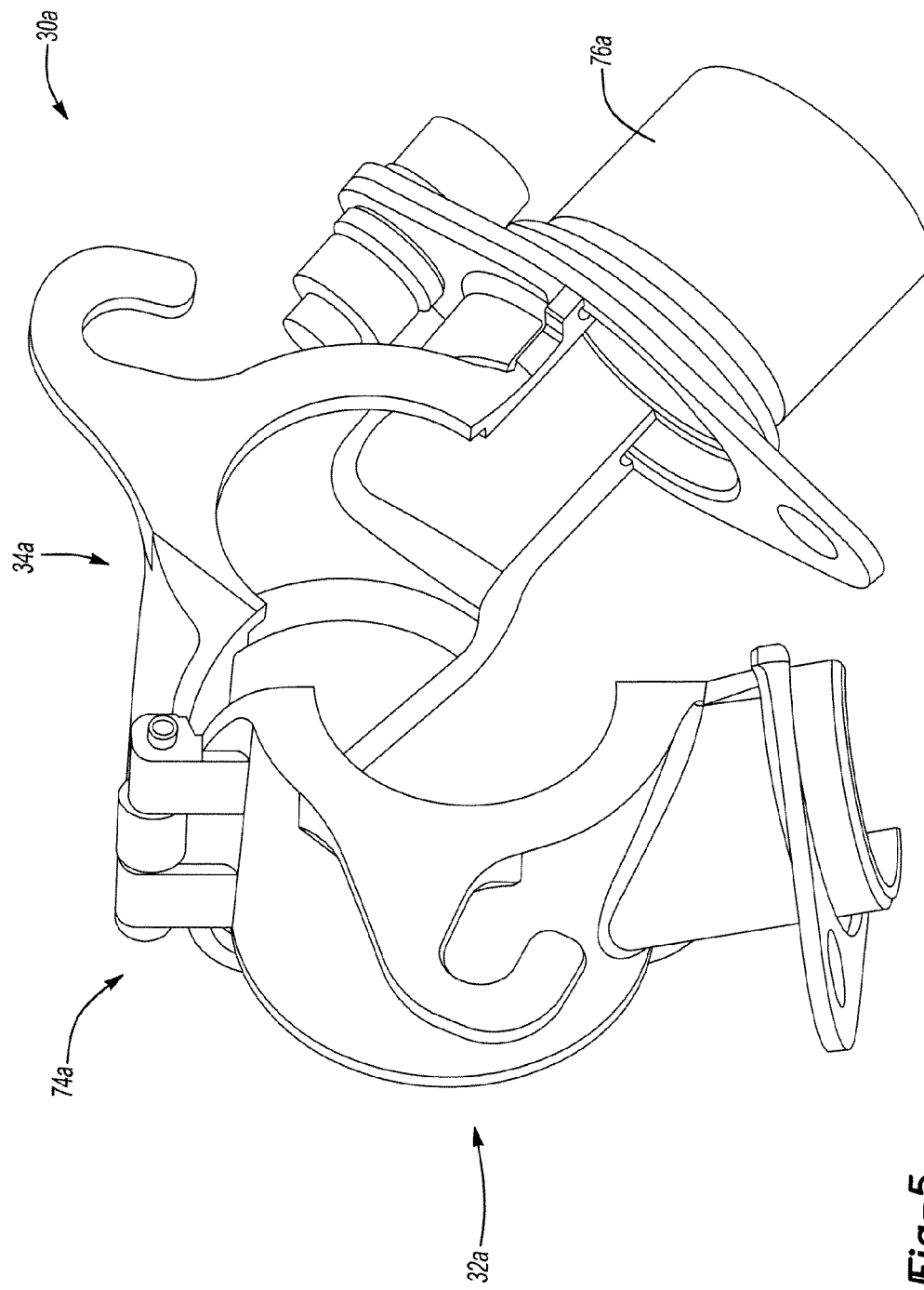
FIG. 5 is a second perspective view of the second exemplary enclosure assembly.

FIGS. 4-7 show a second exemplary embodiment of the invention. In FIG. 4, an enclosure assembly 30a is operable to enclose a fuel nozzle body 26a with a cap 28a and also a portion of a fuel supply line 22a (shown in FIG. 7). The fuel nozzle body 26a with a cap 28a are shown as one component in the cross-sectional views since the internal details are not relevant to the invention. The enclosure assembly 30a includes first and second half-shells 32a and 34a that cooperate with one another in a clam shell arrangement. The nozzle body 26a is enclosed by a nozzle body cover portion 36a of the enclosure assembly 30a. A portion of the fuel line is enclosed by a fuel line cover portion 38a of the enclosure assembly 30a.

The nozzle cover portion 36a includes a half-cup portion 40a of the first half-shell 32a and a half-cup portion 42a of the second half-shell 34a. The fuel line cover portion 38a includes a half-sleeve portion 44a of the first half-shell 46a and a half-sleeve portion 39a of the second half-shell 34a. The portions 40a and 44a are integrally-formed and unitary as are the portions 42a and 39a. The nozzle body cover portion 36a and the fuel line cover portion 38a are thus unitary when the half-shells 32a, 34a are joined together.

The second exemplary embodiment of the invention differs from the first exemplary embodiment in at least two respects. First, the enclosure assembly 30a includes a hinge arrangement 74a connecting the first and second half-shells 32a, 34a together for pivoting movement relative to one another. Second, the enclosure assembly 30a includes an extension sleeve 76a attachable to the fuel line portion 38a. The hinge arrangement 74a allows the first and second half-shells 32a, 34a to be retained together when the enclosure 30a is removed for servicing the nozzle body 26a. Also, the hinge arrangement 74a can be useful when re-installing the enclosure 30a. For example, one of the half-shells 32a, 34a can be fixed to the combustor section and then the half-shells 32a, 34a can be connected together. The extension sleeve 76a can be useful to render a single size of half-shells 32a, 34a usable in a plurality of different engines. In other words, the extension sleeve 76a can be relatively longer or shorter to accommodate any particular environment, while the half-shells 32a, 34a can be similarly sized.

Figure 6:
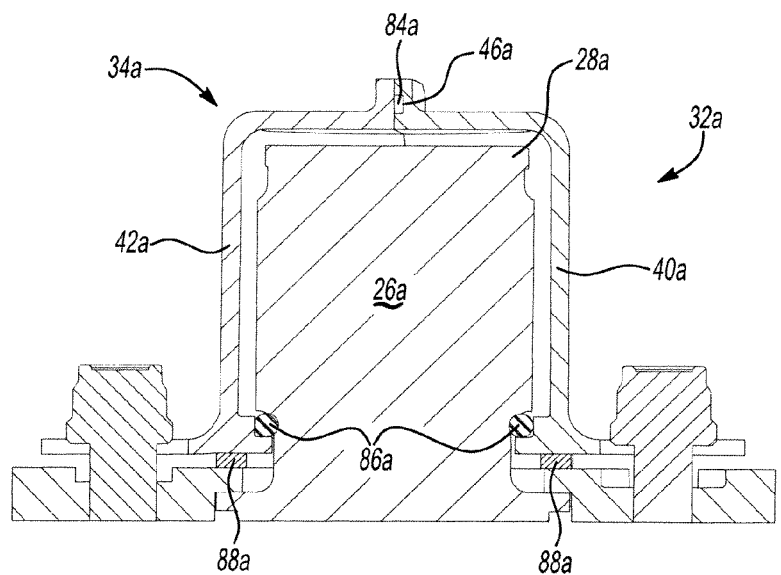
FIG. 6 is a cross-sectional view taken along lines 6-6 in FIG. 4 when the second exemplary embodiment of the invention is in operation.
Figure 7:
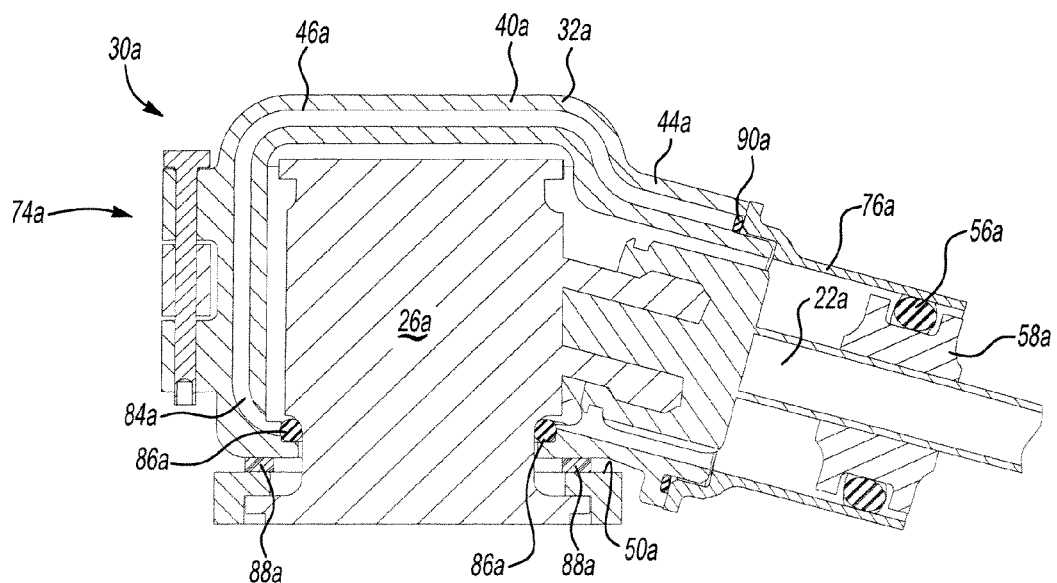
FIG. 7 is a cross-sectional view taken along lines 7-7 in FIG. 4 when the second exemplary embodiment of the invention is in operation.

The cross-sectional views of FIGS. 6 and 7 show sealing aspects of the second exemplary embodiment of the invention. A seal 84a is disposed in a track 46a of the half-shell 32 and seals the half-shells 32a, 34a relative to one another. An o-ring 86a encircles the fuel nozzle body 26a and seals the fuel nozzle body 26a relative to the half-shells 32a, 34a. A seal 88a also encircles the fuel nozzle body 26a and seals the half-shells 32a, 34a relative to a surface 50a of the support structure. An o-ring 90a encircles the fuel supply line 22a and seals the extension sleeve 76a relative to the half-shells 32a, 34a. An o-ring 56a mounted in an annular ferrule 58a seals the fuel line 22a relative to an opening 52a defined by the enclosure assembly 30a. The ferrule 58a can be sealed against the fuel line 22a by joining the parts in a press-fit relationship, or by positioning a seal such as an o-ring between the parts.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An enclosure assembly for a portion of a fuel delivery system comprising:
    a nozzle body cover portion operable to enclose at least a portion of a fuel nozzle body; and
    a fuel line cover portion unitary with said nozzle body cover portion and operable to enclose a portion of a fuel supply line connected to the fuel nozzle body, wherein both of said nozzle body cover portion and said fuel line cover portion are defined by first and second half-shells operable to cooperate together in a clam shell arrangement.

2. The enclosure assembly of claim 1 wherein each of said first and second half-shells further comprise:
    a half-cup portion shaped to correspond to a shape of the nozzle body; and
    a half-sleeve portion shaped differently than said half-cup portion to correspond to a shape of the fuel supply line, wherein said half-cup portion and said half-sleeve portion are integrally-formed and unitary.

3. The enclosure assembly of claim 2 wherein said half-cup portion and said half-sleeve portion cooperate to define first and second openings and wherein said first and second openings are in different planes.

4. The enclosure assembly of claim 1 wherein at least one of said first and second half-shells further comprises:
    at least one recessed track for receiving a sealing structure.

5. The enclosure assembly of claim 4 wherein said at least one recessed track extends along a first portion of a periphery of said enclosure assembly defined between said first and second half-shells and also extends along a second portion of said periphery of said enclosure assembly defined by only one of said first and second half-shells.

6. The enclosure assembly of claim 1 further comprising:
    a hinge arrangement connecting said first and second half-shells together for pivoting movement relative to one another.

7. The enclosure assembly of claim 6 wherein said enclosure assembly defines first and second openings and wherein said hinge arrangement is positioned on said enclosure assembly such that both of said first and second openings widen when said first and second half-shells pivot away from one another.

8. The enclosure assembly of claim 1 further comprising:
    an extension sleeve connectable to said fuel line cover portion.

9. A fuel delivery system for a gas turbine engine comprising:
    a fuel manifold for distributing a supply of fuel; at least one fuel supply line in fluid communication with said fuel manifold for receiving fuel from said fuel manifold;
    at least one fuel nozzle body in fluid communication with said at least one fuel supply line for providing fuel to a combustor section of a gas turbine engine; and
    at least one enclosure assembly having:
    a nozzle body cover portion substantially enclosing said at least one fuel nozzle body and defining a first opening encircling said at least one nozzle; and
    a fuel line cover portion substantially enclosing at least a portion of said at least one fuel supply line and defining a second opening encircling said at least one fuel supply line, wherein both of said nozzle body cover portion and said fuel line cover portion are defined by a first and second half-shells operable to selectively couple and uncouple from one another in a clam shell arrangement.

10. The fuel delivery system of claim 9 further comprising:
    an annular ferrule encircling and sealing against said at least one fuel supply line adjacent to said second opening; and
    an o-ring positioned between said annular ferrule and said fuel line cover portion to seal said second opening.

11. The fuel delivery system of claim 9 further comprising:
    a clamp disposed around said fuel supply line cover portion.

12. The fuel delivery system of claim 9 further comprising:
    at least one drain operable to communicate fluid from an interior of said at least one enclosure assembly.

13. The fuel delivery system of claim 12 wherein said at least one drain is further defined as being positioned to communicate with said fuel supply line cover portion.

14. The fuel delivery system of claim 9 wherein each of said first and second half-shells further comprise:
    a half-cup portion shaped to correspond to a shape of said at least one fuel nozzle body; and
    a half-sleeve portion shaped to correspond to a shape of said at least one fuel supply line, wherein said half-cup portion and said half-sleeve portion are integrally-formed and unitary.

15. The fuel delivery system of claim 14 wherein:
    said first half-shell includes a first flange extending along both of said half-cup portion and said half-sleeve portion with at least one aperture defined in said flange;
    said second half-shell includes a second flange extending along both of said half-cup portion and said half-sleeve portion with at least one aperture defined in said flange, said first and second flanges in back-to-back relationship with said respective apertures aligned; and a fastener extendable through said aligned apertures and fixing said first and second half-shells together.

16. The fuel delivery system of claim 9 wherein said enclosure assembly further comprises:

at least one extension extending cantilevered from said nozzle body cover portion or said fuel supply line cover portion and defining a hook shape for adjustably connecting and positioning said enclosure assembly to an engine.

17. The fuel delivery system of claim 9 further comprising:

a hinge arrangement connecting said first and second half-shells together for pivoting movement relative to one another during assembly to said at least one fuel nozzle and said at least one fuel supply line.

18. The fuel delivery system of claim 17 wherein an axis of said hinge arrangement extends substantially parallel to an axis of said nozzle body cover portion.

19. The fuel delivery system of claim 9 further comprising:

first and second semi-annular flanges respectively extending from said first and second half-shells and aligned together to surround said second opening and each including an aperture; and an extension sleeve for increasing a length of the said fuel supply line cover portion and including an annular flange with a pair of apertures alignable with said apertures of said first and second semi-annular flanges for receiving a fastener.

20. A gas turbine engine comprising: a compressor section for compressing air;

a combustor section positioned to receive the compressed air from said compressor section;

a fuel manifold encircling said combustor section for distributing a supply of fuel;

a plurality of fuel supply lines in communication with said fuel manifold and individually extending to a plurality of different positions about said combustor section;

a plurality of fuel nozzle bodies individually disposed at one of said plurality of different positions and each in communication with one of said plurality of fuel supply lines; and a plurality of enclosure assemblies each being removably attachable to said combustor section and enclosing one of said plurality of fuel nozzle bodies, wherein each enclosure assembly includes a nozzle body cover portion substantially enclosing and defining a first opening around said respective fuel nozzle body wherein said first opening being sealed against said combustor section and wherein each of said enclosure assemblies also includes a fuel line cover portion substantially enclosing at least a portion of said respective fuel supply line and defining a second opening encircling said respective fuel supply line, wherein both of said nozzle body cover portion and said fuel line cover portion are defined by a first and second half-shells operable to selectively couple and uncouple from one another in a clam shell arrangement.

* * * * *